UNITED STATES PATENT OFFICE.

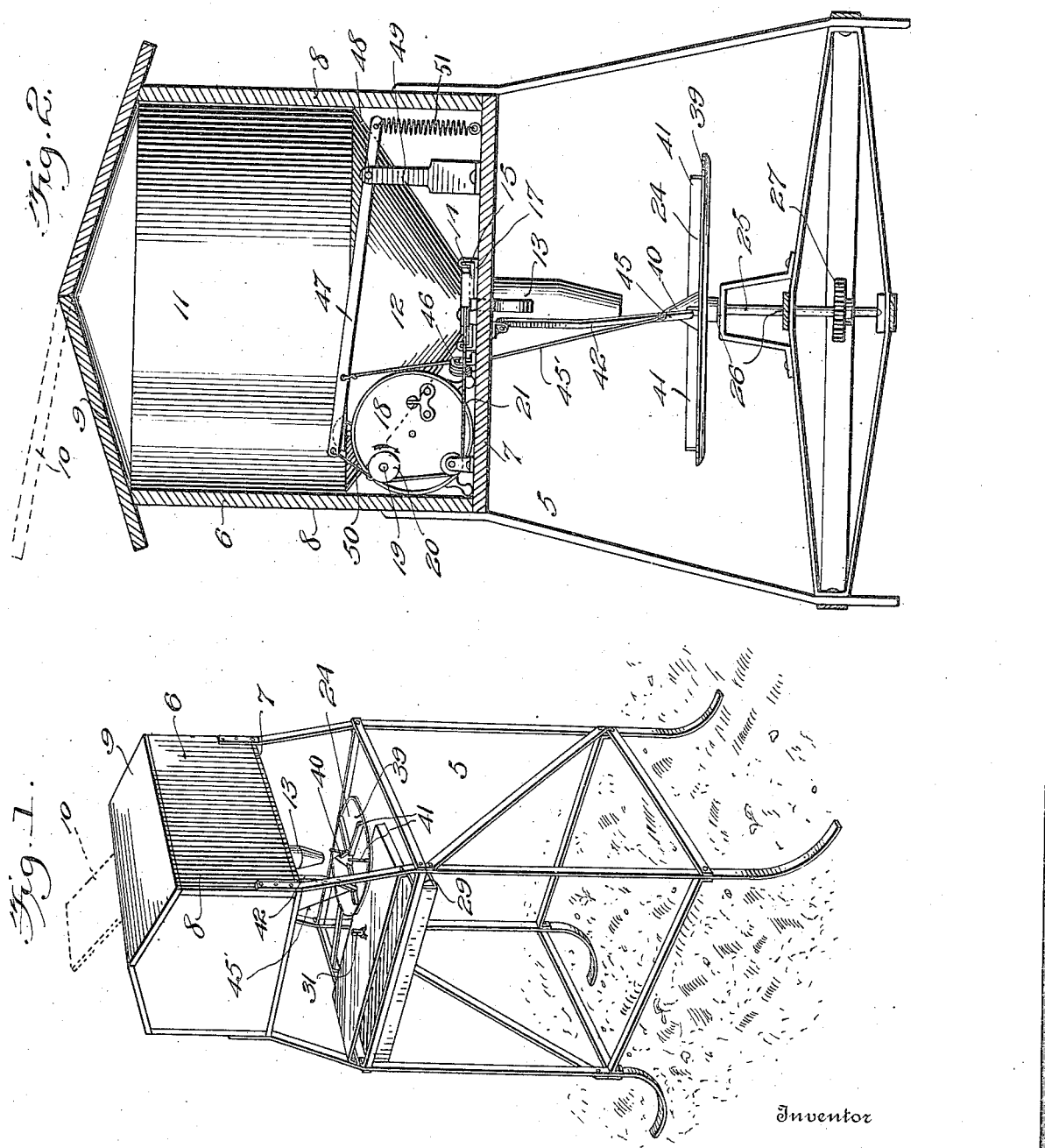

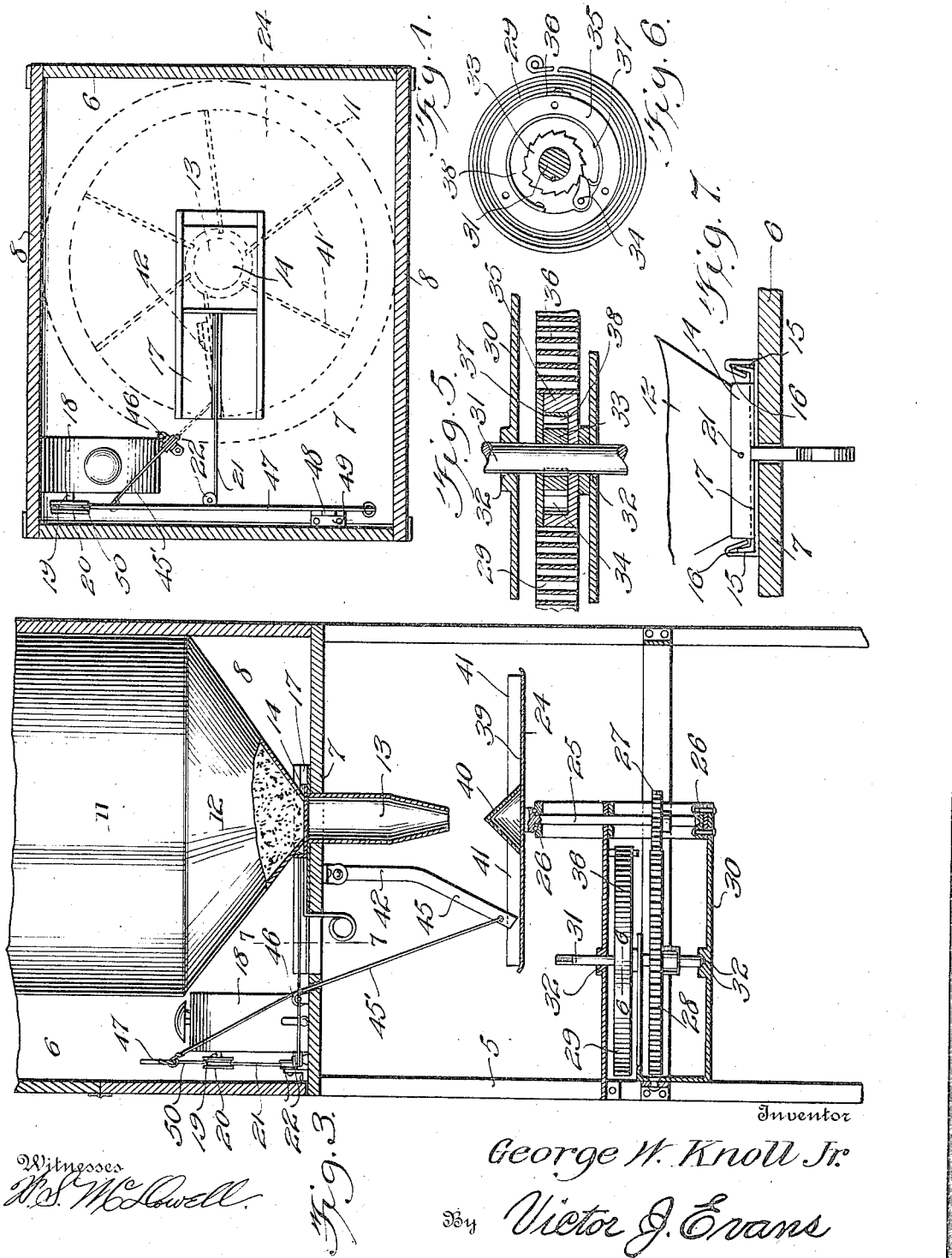

GEORGE W. KNOLL, JR., OF PHILADELPHIA, PENNSYLVANIA.

POULTRY-FEEDING DEVICE.

1,239,404.

Specification of Letters Patent.

Patented Sept. 4, 1917.

Application filed July 11, 1916. Serial No. 108,671.

*To all whom it may concern:*

Be it known that I, GEORGE W. KNOLL, Jr., a citizen of the United States, residing at Philadelphia, in the county of Philadelphia and State of Pennsylvania, have invented new and useful Improvements in Poultry-Feeding Devices, of which the following is a specification.

This invention appertains to poultry feeders and has for an object to provide a structure embodying improved mechanism for automatically distributing poultry feed or grain at a predetermined time.

Another object of the invention resides in a poultry feeder wherein is provided a receptacle for the reception of a specified quantity of feed, an automatic timing device being provided in conjunction with the receptacle for permitting the contents thereof to be discharged at a predetermined time, said timing device having connection with a rotary feed distributer, upon which the feed will fall when being discharged from the receptacle, the movement of said distributer being controlled by a releasing element operated by said timing device.

A further object of the invention resides in a poultry feeder having the above mentioned characteristics and which is provided with improved means for distributing poultry feed in a uniform manner over a circular area immediately surrounding said feeder.

Other objects will be in part obvious and in part pointed out hereinafter.

The invention accordingly consists in the features of construction, combination of elements, and arrangement of parts, which will be exemplified in the construction herein described and the scope of the application of which will be indicated in the following drawings.

In the accompanying drawings, wherein is shown the preferred embodiment of my invention, Figure 1 is a perspective view of a poultry feeder comprising the present invention, Fig. 2 is a transverse sectional view taken through the same, Fig. 3 is a fragmentary vertical longitudinal sectional view, Fig. 4 is a top plan view of the feed distributing pan, Fig. 5 is a vertical sectional view taken through the spring motor mechanism, Fig. 6 is a horizontal sectional view taken along the line 6—6 of Fig. 3, and Fig. 7 is a horizontal sectional view taken on the line 7—7 of Fig. 3.

Similar characters of reference denote corresponding parts throughout all the views of the drawing.

Referring more particularly to the preferred embodiment of the present invention, the poultry feeder illustrated consists of a supporting frame 5 in the form of connected metallic bars, braced to provide a rigid structure. The lower extremities of the bars are curved to rest upon a suitable support, while the upper extremities thereof are secured to a housing or hopper casing 6, said housing consisting of a base 7, side walls 8 and an inclined top 9, the latter being provided with a hinged door 10, which is disposed immediately above a feed receiving hopper or receptacle 11, situated within the housing 6.

The hopper preferably consists of a funnel shaped structure which is adapted to receive a predetermined amount of poultry feed, the latter being inserted into the hopper upon opening the door 10. The lower funnel shaped mouth 12 of the hopper terminates in alinement with a discharging pipe 13 secured to the base 7 of the housing 6. Interposed between the mouth 12 of the hopper and the discharge pipe 13 is a sliding trap door 14, the latter being normally employed to prevent the feed contained within the hopper from being discharged therefrom into the pipe 13, by covering the discharge opening of the hopper. The door is provided with mechanism, to be hereinafter fully set forth, to reciprocate the same to a position clear of the discharge opening of the hopper whereby the feed contained in the latter will be emptied into the pipe 13.

The door 14 is preferably made in the form of a metallic plate and is provided with upturned edges 15, Fig. 7, which are received within guide grooves 16 formed in a wear plate 17, the grooves 16 being provided in order that the door 14 will be moved in a regulated manner with respect to the hopper 11. Situated within the housing 6 is an ordinary alarm clock 18, which is provided with a shaft 19 capable of rotating at predetermined periods, the clock being of the usual construction and will therefore not require a detailed description. Mounted on the actuating shaft 19 of the alarm clock is a wheel 20, which is secured in a rigid manner to said actuating shaft, so that when the latter is revolved, upon the movement of the alarm mechanism, the wheel 20 will be revolved. Secured to the periphery of the wheel 20 is a cable 21 which is trained over suitable pulleys 22 and is connected to one extremity of the door 14, whereby when the alarm clock 18 is thrown into operation, the wheel 20 will be revolved, thus imparting a pull to the cable 21 thereby causing the withdrawal of the door 14 from its position blocking the passage of grain or feed into the discharge opening 13, so that feed will be delivered from the hopper to a distributing mechanism to be hereinafter described.

The feed distributing mechanism preferably consists of a distributing pan 24 located immediately beneath the discharge pipe 13 and in axial alinement with the latter. The pan 24 is mounted upon a vertical shaft 25 journaled in bearings 26, which are secured to the supporting frame 5. The shaft 25 is provided with pinion 27 designed to mesh with an enlarged drive gear 28 driven by a spring motor 29, the motor 29 being mounted in a frame 30 secured to the supporting frame 5. Said motor may be of any desirable construction and is designed to impart movement to the gear 28, however, in this instance, it has been shown to comprise a drive shaft 31 supported, for rotation, in bearings 32 formed on the frame 30. Said shaft is provided with a splined ratchet wheel 33 adapted to coöperate with a pivoted pawl 34 secured to a casing 35, the latter has one extremity of a clock spring 36 secured thereto, while the opposite extremity of the spring is rigidly secured to the frame 30. Thus it will be seen that the normal unwinding action of the spring 36 will revolve the shaft 31 and its connected gear 28 so that movement will be imparted to the shaft 25 to cause a rotation of the distributing pan 24. The pawl 34 is normally pressed into engagement with the teeth of the ratchet wheel 33 by means of a spring 37 secured to the casing 35, and is positioned within the internal chamber 38 formed therein. The pawl 34 is utilized to relieve the spring 36 of strains arising from the momentum of the enlarged gear 28, at it will be seen that when the spring 36 ceases to unwind the gear 28 will be rapidly revolving and the ratchet and pawl construction 33 and 34 is provided in order that the gear 28 may continue to revolve independently of the spring 36, thus the rotation of the gear 28 will not be immediately retarded when the spring 36 ceases to unwind thereby avoiding strains or stresses upon said spring, as will be obvious.

The distributing pan 24 is of peculiar construction, and is provided with means for distributing feed received from the hopper 11 in a uniformly scattered manner over a circular area about the feeder, of which the pan 24 is the center. Said pan comprises a disk like body 39 to which the upper end of the shaft 25 is secured, and the disk has mounted on the upper face thereof a conical member 40 which is disposed immediately below and in alinement with the discharge pipe 13, so that feed delivered by the pipe 13 will fall upon the conical member 40 whereby the same will be uniformly distributed over the face of the disk 39. Tangentially positioned ribs 41 radiate from the member 40 to the outer periphery of the disk 39 and are employed to assist in distributing the feed over the area surrounding said distributing pan. It will be apparent that the feed deposited upon the pan 24 will be discharged therefrom by the action of centrifugal force, generated by the rapidly revolving distributing pan and that the distribution of feed from the pan will be accomplished in an efficient manner which permits the feed to be widely scattered, so that the same will not fall in a concentrated manner in one spot or place adjacent to the feeder.

The motor 29 may be wound by actuating the shaft 31 in a specified direction and said motor will be retained in its wound position by the action of a releasing trigger 42 pivotally mounted upon the base 7 of the housing 6, said trigger being provided with a depending arm 45 which normally coöperates with one of the ribs 41 of the distributing pan in such a manner that the rotation of the latter will be hindered, thereby preventing the motor 29 from unwinding. In order to permit the pan 24 to revolve immediately before feed is deposited thereon, the trigger 42 has connected to the arm 47 thereof a flexible cable 45', which is trained over suitable pulleys 46 in order that the same may be connected with a spring pressed lever 47, pivotally mounted as at 48 to a bracket 49, the latter being disposed interiorly of the housing 6. The lever 47 is connected with the wheel 20 by means of a suitable chain connection 50 secured to the periphery of this wheel 20, so that when said wheel begins to revolve upon the operation of the alarm mechanism of the clock 18, the lever 47 will be permitted to be raised, inasmuch as the connection 50 will be lengthened so as to allow the spring 51 of the lever 47 to contact; when the lever 47 is being elevated the cable 45 will be pulled to oscillate the lever 42, so that the extremity 43 thereof will be drawn out of engagement with the ribs 41 of the distributing pan, thus permitting the latter to be rotated by the action of the motor 29. One important feature of the present invention resides in the fact that the distributing pan 24 is in motion before feed is deposited thereon, in order that the distributing of the feed will be facilitated, this being accomplished by the relatively quick operation of the lever 47 and the trigger 42 and by their points of connection with the cable 45. This construction enables the pan to be in motion by the time the slack found in the cable 21 will have been taken up by the rotation of the wheel 20. After the cable 21 is drawn taut the door 14 is moved to a position clear of the discharge mouth 12 of the hopper 11.

From the foregoing it will be seen that the objects of the present invention have been achieved and all the advantageous features above mentioned are, among others, present. The device is simple in construction, of relatively few parts which are so constructed as not to be liable to become out of order; is positive in operation and the mechanism thereof will be automatically thrown into operation without requiring the services of an operator. The feeder requires little attention and will efficiently distribute the feed by a more uniform scattering of the same over a given area, than can be accomplished when manually distributed.

As many changes could be made in the above construction and many apparently widely different embodiments may be provided without departing from the scope thereof, it is intended that all matter contained in the above description and shown in the accompanying drawings shall be interpreted as illustrative and not in a limiting sense.

Having described the invention what is claimed as new and patentable is:—

1. In an automatic poultry feeder, a feed receiving receptacle, a door movably disposed within said receptacle, means for imparting a horizontal movement to said door at predetermined periods, a rotatable feed distributing pan coöperating with the feed receptacle and adapted to receive the feed discharged from the latter, a release mechanism having contact with said distributing pan, and means for operating said pan upon the disengagement of the release mechanism from said distributing pan.

2. In an automatic poultry feeder, a feed receiving receptacle, a door movably disposed within said receptacle, means for imparting a horizontal movement to said door at predetermined periods, a rotatable feed distributing pan coöperating with the feed receptacle and adapted to receive the feed discharged from the latter, a release mechanism having contact with said distributing pan, and means for operating said pan upon the disengagement of the release mechanism from said distributing pan, said last mentioned means being controlled by the door operating means.

3. In an automatic poultry feeder, a feed receptacle, a door for controlling the discharge of the feed from said receptacle, means for operating said door at predetermined periods, an automatic rotatable feed distributing pan, a release mechanism carried by the feed receptacle and co-acting with the feed distributing pan for locking the same against movement, and means connected with the release mechanism for causing the release of the same from the feed distributing pan simultaneously with the operation of said door.

4. In an automatic poultry feeder embodying a feed receptacle, a movable door for controlling the discharge of the feed therefrom, door operating means, a rotatable feed distributing pan, means for controlling the movement of said pan, and means connected with the latter mentioned means and having connection with the door operating means for imparting an oscillating movement of the former upon the opening of said door.

5. In an automatic poultry feeder embodying a feed receiving receptacle, a door for controlling the discharge of the feed from said receptacle, operating mechanism for said door, a rotatable feed distributing pan, a member pivotally connected with the feed receptacle and contacting with the feed distributing pan for holding the latter against rotation, and means having connection with said member and with the door operating mechanism, for releasing said member from the distributing pan upon the actuation of the door operating mechanism.

6. In an automatic poultry feeder embodying a feed receiving receptacle, a door for controlling the discharge of the feed from said receptacle, operating mechanism for said door, a rotatable feed distributing pan, a member pivotally connected with the feed receptacle and contacting with the feed distributing pan for holding the latter against rotation, and spring tensioned means having connection with said member and with the door operating mechanism, for releasing said member from the distributing pan upon the actuation of the door operating mechanism.

7. In an automatic poultry feeder embodying a feed receiving receptacle, a door for controlling the discharge of the feed from said receptacle, operating mechanism for said door, a rotatable feed distributing pan, a member pivotally connected with the feed receptacle and contacting with the feed distributing pan for holding the latter against rotation, and means having connection with said member and with the door operating mechanism, for oscillating the member to release the same from engagement with the feed distributing pan upon actuation of the door operating mechanism.

8. In an automatic poultry feeder a feed receiving receptacle, a door for controlling the discharge of the feed from said receptacle, a timing device, means operatively connecting the door with said timing device, a rotatable feed distributing tank, a lever having connection with the timing device, means for controlling the movement of said feed distributing pan, and means connecting the latter mentioned means with said lever for operatively releasing the same upon the actuation of said door.

9. In an automatic poultry feeder a feed receiving receptacle, a door for controlling the discharge of the feed from said receptacle, a timing device, means operatively connecting the door with said timing device, a rotatable feed distributing pan, a lever having connection with the timing device, means for automatically operating said lever, means for controlling the movement of said feed distributing pan, and means connecting the latter mentioned means with said lever for operatively releasing the same upon the actuation of said door.

10. In an automatic feeding device of the class described, a feed receptacle, a movable door controlling the feed discharge mouth of said receptacle, automatic means for moving said door away from said discharge mouth at a predetermined period to permit feed to be discharged from said receptacle, a horizontally disposed rotatable feed distributor communicating with said discharge mouth and adapted to receive feed discharged from said receptacle when said door is clear of the mouth of the latter, tangentially disposed ribs positioned upon said feed distributer, means coöperating with ribs to normally prevent the rotation of said distributer and said distributer controlling means having connection with the automatic means for moving said door and said connection being of such character that said distributer will be in a state of rotation before said movable door is operated.

In testimony whereof I affix my signature.

GEORGE W. KNOLL, Jr.

Copies of this patent may be obtained for five cents each, by addressing the "Commissioner of Patents, Washington, D. C."